Figure 1:
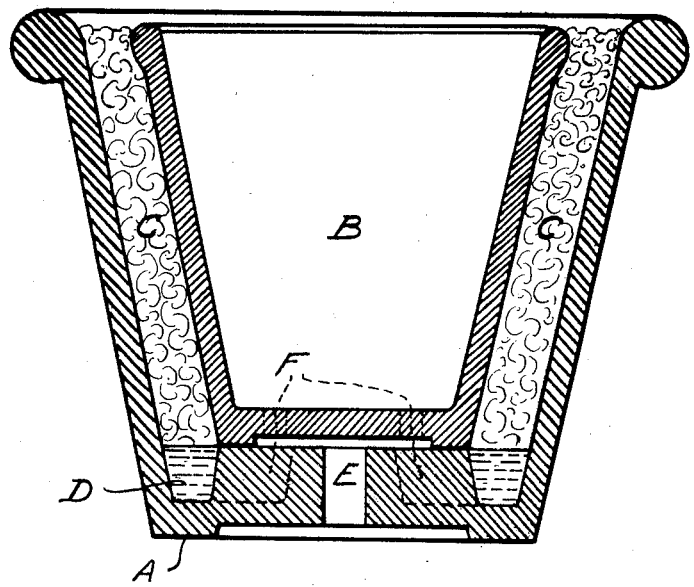
Figure 2:
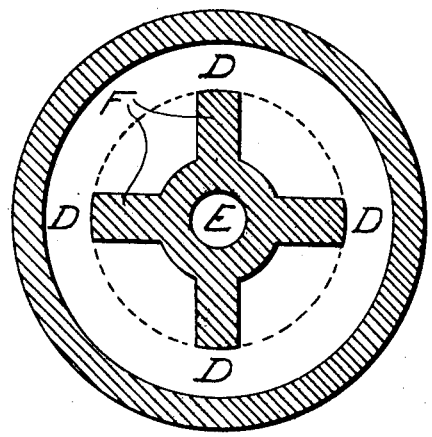

Oct. 3, 1933.  J. F. M. BURFORD  1,928,810

TYPE OF POTTERY TO GROW PLANTS INDOORS OR OUTDOORS

Filed July 5, 1932

INVENTOR

J. Miles Burford

Patented Oct. 3, 1933

1,928,810

UNITED STATES PATENT OFFICE 1,928,810

TYPE OF POTTERY TO GROW PLANTS INDOORS OR OUTDOORS

Justus Fernand Miles Burford, Bronxville, N. Y.

Application July 5, 1932. Serial No. 620,835

2 Claims. (Cl. 47—38)

The invention relates to an improved type of plant pottery in which an outer impervious container is used in conjunction with an inner porous clay flower pot. The object of the improvement is to conserve moisture in the soil mass of the inner flower pot by preventing excessive evaporation which usually occurs through the sides of clay or other porous pots; it also affords at the same time adequate drainage to protect the soil mass from becoming sour and water-logged.

The feature of the invention is carried out after watering the plant; a certain amount of the water is collected or drained into the inside bottom of the outer container which is shaped to act as a shallow water reservoir or inner saucer. The collected water is thereby stored up and keeps constantly moist a layer of fibrous absorbent material which is firmly packed in the annular space between the inner and outer containers.

The invention is illustrated in the accompanying drawing in which Fig. "1" is a vertical cross section of the complete combination, Fig. "2" is a plan of the inside bottom of the outer container.

The outer container "A" is impervious and acts as a decorative jardiniere; the reservoir or inner saucer at the inside bottom is caused by reason of the raised drain hole "E"; it is surrounded with a series of projecting arms or supports "F" on which rests the inner flower pot "B." The layer of fibrous absorbent material "C" is kept moist by the water "D" in the reservoir; it prevents excessive and harmful evaporation which would otherwise occur through the porous sides of the inner flower pot. The dotted line in Fig. "1" forms the outline of inner saucer and raised drain hole; the dotted line in Fig "2" shows the outer edge of the bottom of the inner clay flower pot. The inner pot has four little drain holes and is made in standard sizes; the sizes of the outer container are determined by those of the inner liner.

This improved type of pottery is particularly useful in unfavorable conditions and in places where the plants are apt to become neglected, as in homes, on porches, patios, penthouses, public buildings, offices etc.

I am aware that prior to my invention combinations of an outer nonporous container with an inner porous container to grow plants have been used; however they pertained to various way of watering pot plants, either by sinking in water; or by using a combination based on a vacuum principle that forces water to a definite height in a prepared material that surrounds and seals the inner growing pot; or by using the force of capillarity and connecting the soil mass with a water receptacle. My invention differs in the fact that I do not change the ordinary method of watering pot plants; my principle is to conserve soil moisture by preventing excessive evaporation through the sides of an inner clay flower pot. There is also no danger of the soil mass becoming sour and water-logged as adequate drainage and aeration are provided. I am also aware that detached supports have been used to keep the under sides of flower pots dry and ventilated; my improvement differs in the fact that there is a series of supporting arms radiating from an annular portion immediately surrounding a center drain hole and being inherent parts of the outer container.

I can use any number of radiating arms to equal advantage, therefore I do not limit myself to the use of only four supports as illustrated in the attached drawing; also varying decorative shapes can be made of the outer container.

I claim.

1. A type of pottery for growing plants, comprising an outer impervious flower pot container, an inner porous clay flower pot, and a layer of fibrous absorbent material between said container and pot; said outer container having a drain hole through the center of its bottom and an upward projection from the inner surface of said bottom surrounding said drain hole; said inner pot resting on said projection; said projection forming with the walls and bottom of said outer container an inner saucer or reservoir adapted to retain some of said absorbent material and enough water to keep said absorbent material constantly moist.

2. The structure of claim 1, in which said projection comprises an annular portion immediately surrounding said drain hole and a series of arms radiating therefrom to support said inner pot.

J. F. MILES BURFORD.